(12) United States Patent
Baker et al.

(10) Patent No.: US 6,507,735 B1
(45) Date of Patent: Jan. 14, 2003

(54) AUTOMATED SHORT MESSAGE ATTENDANT

(75) Inventors: Steven F. Baker, Alpharetta, GA (US); Kevin Swank, Plano, TX (US)

(73) Assignee: Nortel Networks Limited, Montreal (CA)

( * ) Notice: Subject to any disclaimer, the term of this patent is extended or adjusted under 35 U.S.C. 154(b) by 0 days.

(21) Appl. No.: 09/219,696

(22) Filed: Dec. 23, 1998

(51) Int. Cl.⁷ .............................................. H04M 11/10
(52) U.S. Cl. ........................ 455/412; 455/417; 455/445; 455/466; 455/563
(58) Field of Search .................................. 455/412, 413, 455/414, 417, 421, 445, 458, 466, 432, 563, 422; 379/88.15, 210, 211, 212, 88.04, 88.14; 704/235, 275, 270, 273; 340/825.44

(56) References Cited

U.S. PATENT DOCUMENTS 5,504,804 A * 4/1996 Widmark et al. ............ 455/414
5,712,901 A * 1/1998 Meermans .................... 379/88
6,073,103 A * 6/2000 Dunn et al. .................. 704/275
6,144,723 A * 11/2000 Truchon et al. .......... 379/88.04

FOREIGN PATENT DOCUMENTS

WO          92/14330    *  8/1992    ................. 455/466

* cited by examiner

*Primary Examiner*—Vivian Chin
*Assistant Examiner*—James K Moore
(74) *Attorney, Agent, or Firm*—John D. Crane; Thompson & Knight, LLP; H. Lisa Calico

(57) ABSTRACT

A mobile switching center receives a call to a wireless telephone unit and determines if the wireless telephone unit is available to receive calls. If the wireless unit is unavailable, the mobile switching center forwards the call to a wireless service node, preferably immediately and without providing any ring back tone to the calling party. The wireless service node prompts the calling party to speak a message for transmission to the wireless telephone unit. The wireless service node converts the message spoken by the calling party from a speech message to a text message and forwards text message to a short message service center for transmission to the wireless unit.

10 Claims, 2 Drawing Sheets

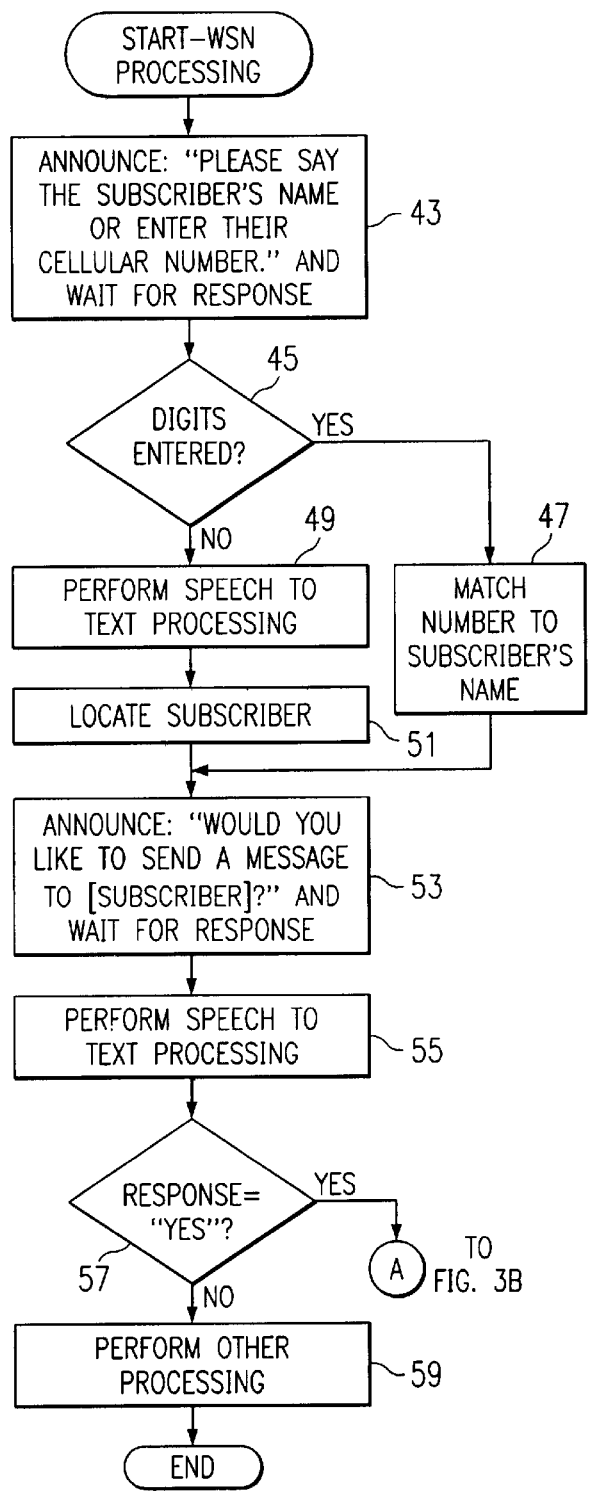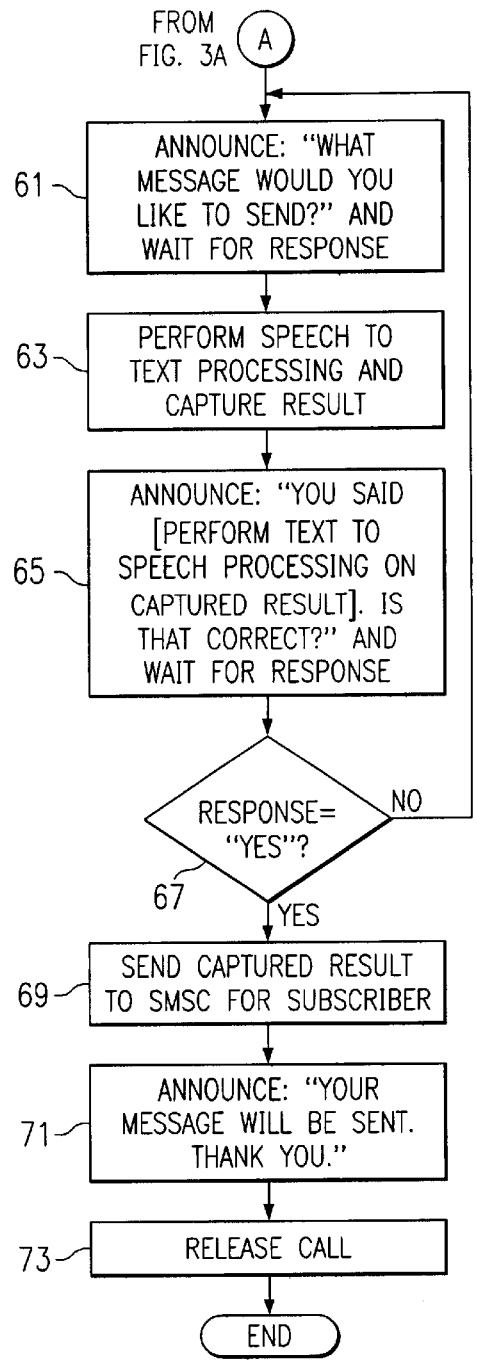

US 6,507,735 B1

AUTOMATED SHORT MESSAGE ATTENDANT

FIELD OF THE INVENTION

The present invention relates generally to the field of wireless telecommunication, and more particularly to an automated short message attendant that captures a spoken message for transmission to a wireless unit through a short message service.

DESCRIPTION OF THE PRIOR ART

Currently, when a wireless subscriber is not reachable, the calling party waits through a series of ring back tones and is eventually provided with an announcement indicating that the cellular subscriber cannot be reached. If the subscriber has voice mail, the call is eventually routed to the subscriber's voice mail box where the caller listens to the subscriber's greeting and leaves a message. The subscriber accesses voice mail messages by calling his or her voice mail box and navigating through voice response mail selection menus. If the subscriber does not have voice mail, the calling party is simply advised that the subscriber is not available and the call is terminated.

In addition to normal voice services, wireless operators offer short message services to wireless subscribers. A short message service enables a user with a short message service enabled wireless unit to receive and send the text messages over the wireless network. The short messages are typically transmitted over a control channel of the wireless network rather than a voice channel. The short message service attempts to deliver a message to a wireless unit whenever the unit is registered to the network, even when the terminal is engaged in a voice or data call.

Presently, wireless operators offer three options for sending a short message to a wireless subscriber. One option uses a dedicated human operator who enters the messages directly into a short message system center. A second option uses an interactive voice response unit that offers a limited array of predefined message options that can be navigated using the telephone keypad touch tone input. The third option uses a web-based home page that allows a user to type in a message or select from a number of predefined messages. While these options are effective in today's market, they do have various drawbacks. The option requiring the human operator involves additional staffing costs. The voice response unit system, while cheaper to operate, is quite limited in its predefined message set. The web-based system is quite robust and does not require additional staff. However, the web based system does require the user to have access to a personal computer or other web-capable device.

SUMMARY OF THE INVENTION

Briefly stated, the present invention provides an automated short message attendant that interacts with a calling party to send a short message to a wireless unit that is unavailable to receive voice calls. According to the present invention, a mobile switching center receives a call to a wireless telephone unit and determines if the wireless telephone unit is available to receive calls. If the wireless unit is unavailable, the mobile switching center forwards the call to a wireless service node, preferably immediately and without providing any ring back tone to the calling party. The wireless service node prompts the calling party to speak a message for transmission to the wireless telephone unit. The wireless service node converts the message spoken by the calling party from a speech message to a text message and forwards text message to a short message service center for transmission to the wireless unit.

Prior to forwarding the text message to the short message service, the wireless service node may announce the text message and prompt the calling party to verify that the announced text message is the message the calling party wishes to have transmitted to the wireless unit. If the announced text message is not acceptable to the calling party, the wireless service node prompts the calling party to repeat the message. The wireless service node converts the repeated message from a speech repeated message to a text repeated message and announces the text repeated message, again giving the calling party the opportunity to verify that the announced text repeated message is the message said calling party wishes to have transmitted to said wireless unit.

The wireless service node may prompt the calling party to identify the wireless unit by prompting the calling party either to speak the name or mobile identification number of a subscriber associated with the wireless unit or to enter the mobile identification number. If the calling party speaks a name or number, the wireless service unit converts the name or number spoken by the calling party from a speech name or number to a text name or number and attempts to locate a wireless unit subscriber identified by the text name or number. The wireless service node announces the name of the located subscriber and prompts the calling party to verify that the announced name correctly identifies the subscriber for whom the calling party wishes to leave a message. If the calling party enters a number, the wireless service node locates the name of the subscriber associated with the number entered by the calling party. Then, the wireless service node announces the located name and prompts the calling party to verify that the announced name correctly identifies the subscriber for whom the calling party wishes to leave a message.

BRIEF DESCRIPTION OF THE DRAWINGS

FIGS. 3A and 3B comprise a flowchart of wireless service node processing according to the present invention.

DESCRIPTION OF THE PREFERRED EMBODIMENT

Figure 1:
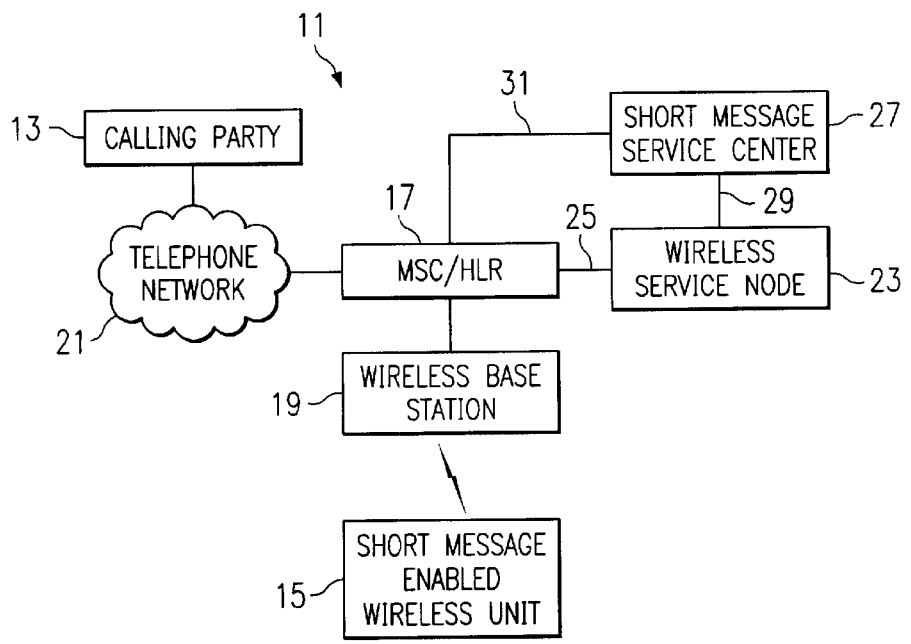
FIG. 1 is a block diagram of a system according to the present invention.

Referring now to the drawings, and first to FIG. 1, a telephone system is designated generally by the numeral 11. Telephone system 11 is adapted to process calls from a calling party, indicated generally at 13 to a short message enabled wireless unit 15. Short message enabled wireless unit 15 is provided with services by a wireless telephone system, which includes a mobile switching center 17 and a wireless base station 19. Mobile switching center 17 is connected to calling party 13 through a telephone network, indicated generally at 21.

Generally, when a call is received at mobile switching center 17, the mobile switching center consults a home location register (HLR) or a visitor location register (VLR) to obtain routing information. The call is then routed to the appropriate wireless base station 19 for transmission to wireless unit 15. According to the present invention, mobile switching center 17 tracks the status of wireless unit 15. Whenever the HLR or VLR indicate that wireless unit 15 is busy, unreachable, or otherwise unavailable to receive voice calls, mobile switching center 17 immediately connects calling party 13 to a wireless service node 23 over a voice trunk 25.

Wireless service node 23 is programmed according to the invention to carry on an automated natural language dialog with calling party 13. Wireless service node 23 includes a speech recognition system such as Dragon NaturallySpeaking™ or IBM ViaVoice™. As will be explained in detail hereinafter, wireless service node 23 provides calling party 13 with the opportunity to have a short message delivered to short message enabled wireless unit 15. Wireless service node 23 converts a spoken message to a text message that is communicated to a short message service center 27 over a short message point-point interface 29. Short message service center 27 stores short text messages for wireless subscribers. When wireless unit 15 is available to receive a short message, short message center 27 forwards the short messages stored for the subscriber to mobile switching center 17 over an IS-41 interface 31. Mobile switching center 17 delivers the short message to wireless base station 19, which in turn delivers the short message to wireless unit 15.

Figure 2:
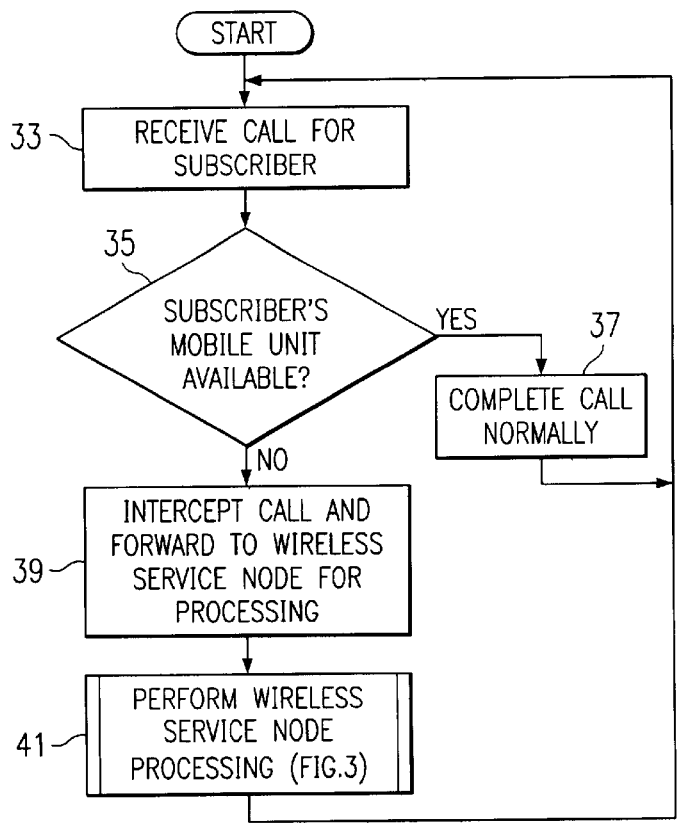
FIG. 2 is a high level flow chart of call processing according the present invention.

Referring now to FIG. 2, there is shown a high level flow chart of call processing according to the present invention. When a call is received for a subscriber, at block 33, the mobile switching center consults the home location register to determine if the subscriber's mobile unit is available. If, at decision block 35, the mobile unit is available, then the call is completed normally, as indicated generally at block 37 and processing returns to block 33. If the subscriber's mobile unit is not available, then the mobile switching center routes the call to the wireless service node for processing, at block 39. The wireless service node processes the call, as indicated generally at block 41 and shown in detail with respect to FIG. 3.

Referring now to FIG. 3A, the wireless service node announces "Please say the subscriber's name or enter their cellular number." and waits for a response at block 43. If, at decision block 45, the calling party enters digits, the wireless service node collects the entered digits and matches the number entered to a subscriber's name, at block 47. If the calling party says the subscriber's name, then the wireless service node performs speech to text processing, at block 49, and locates the subscriber at block 51. As will be apparent to those skilled in the art, if the wireless service node is unable to locate the subscriber or match the digits entered to a subscriber's name, then wireless service node invokes error processing or exception handling. After the wireless service node has located the subscriber, the wireless service node gives the calling party the opportunity to send a short message to the subscriber by announcing "Would you like to send a message to [subscriber's name]?" and waits for response, at block 53. As the calling party responds, the wireless service node performs speech to text processing at block 55. If the subscriber's response is not "yes", at decision block 57, the wireless service node performs other processing, at block 59. If the calling party's response is "yes", then processing continues at block 61 of FIG. 3B.

At block 61, the wireless service node announces "What message would you like to send?" and waits for a response. The wireless service node performs speech to text processing and captures the result at block 63. Then the wireless service node gives the calling party the opportunity to confirm that the message they spoke was correctly captured by announcing "You said [captured message]. Is that correct?" and waits for a response, at block 65. If, at decision block 67, the calling party's response is not "Yes" then processing returns to block 61. If the calling party confirms that the captured message is correct, then the wireless service node sends the captured result to the short message service center for the subscriber at block 69. Then, the wireless service node announces "Your message will be sent. Thank you.", at block 71 and releases the call, at block 73. The short message service center delivers the short message to the wireless unit as soon as the wireless unit becomes available to receive short messages, in the manner known to those skilled in the art.

From the foregoing, it may be seen that the method and system of the present invention improve wireless call processing by eliminating the need for the calling party to wait for the subscriber to be found before being offered an alternative means to contact the subscriber. The present invention does this by tracking the status of the subscriber's mobile unit. Any call that terminates to a subscriber will cause the system to verify if the subscriber's handset is available, i.e., reachable and not busy. If the wireless unit is available, then the call is routed normally. If not, then the system of the present invention intercepts the call immediately, before any ring back tone, and offers the calling party the option of sending a short message to the subscriber. The subscriber gets the message as soon as his or her wireless unit is available to receive short messages without having to access his or her wireless voice mail system. The system of the present invention thus provides a less obtrusive method of leaving messages for unavailable wireless subscribers. The subscriber does not have to access voice mail and then navigate a voice response unit to get their messages.

The system of the present invention combines IS-41 capabilities with natural speech recognition to provide an improved mechanism for reaching a subscriber. IS-41 tracks when a subscriber's wireless unit is on, off, or out of range and enables all calls to that subscriber to be intercepted and transferred to the wireless service node when the subscriber is not available. Once the call is at the wireless service node, the calling party interacts naturally with a natural speech recognition system or engine to send a short message to the subscriber.

What is claimed is:

1. A system for processing calls from a calling party to a wireless telephone unit, said system comprising:
   a mobile switching center;
   a wireless service node connectable to said mobile switching center, said wireless service node including speech recognition means for converting speech to text;
   means for determining whether said wireless telephone unit is unavailable based upon location register information;
   means for intercepting and completing a call to said wireless service node prior to attempting to connect said call to said wireless telephone unit, if said wireless telephone unit is unavailable; and
   a short message service center in communication with said wireless service node and said mobile switching center, said short message service center including means for storing short text messages received from said wireless service node and forwarding said short text messages to said mobile switching center.

2. The system as claimed in claim 1, wherein said wireless service node includes:
   means for prompting said calling party to speak a message for transmission to said wireless telephone unit; and means for forwarding said text message to said short message service center for transmission to said wireless telephone unit.

3. The system as claimed in claim 2, wherein said wireless service node includes:

means for announcing said text message; and means for prompting said calling party to verify that the announced text message is the message the calling party wishes to have transmitted to said wireless telephone unit.

4. The system as claimed in claim 3, wherein said wireless service node includes:

means for prompting said calling party to repeat the message for transmission to said wireless telephone unit;

means for announcing a converted text version of said repeated message; and prompting said calling party to verify that said announced text version repeated message is the message said calling party wishes to have transmitted to said wireless telephone unit.

5. The system as claimed in claim 1, wherein said wireless service node includes:

means for prompting said calling party to identify said wireless telephone unit.

6. The system as claimed in claim 5, wherein said means for prompting said calling party to identify said wireless telephone unit includes:

means for prompting said calling party to speak the name of a subscriber associated with said wireless telephone unit; and means for locating a wireless telephone unit subscriber identified by said text name.

7. The system as claimed in claim 6, wherein said wireless service node includes:

means for announcing the name of the located subscriber; and means for prompting said calling party to verify that the announced name identifies the subscriber for whom the calling party wishes to leave a message.

8. The system as claimed in claim 2, wherein said means for prompting said calling party to identify said wireless telephone unit includes:

means for prompting said calling party to enter the telephone number associated with said wireless telephone unit.

9. The system as claimed in claim 8, wherein said wireless service node includes:

means for announcing the name of the subscriber associated with the telephone number entered by said calling party; and means for prompting said calling party to verity that the announced name identifies the subscriber for whom the calling party wishes to leave a message.

10. The system as claimed in claim 1, wherein said call is intercepted without providing any ring back tone to said calling party.

* * * * *